No. 769,405. Patented September 6, 1904.

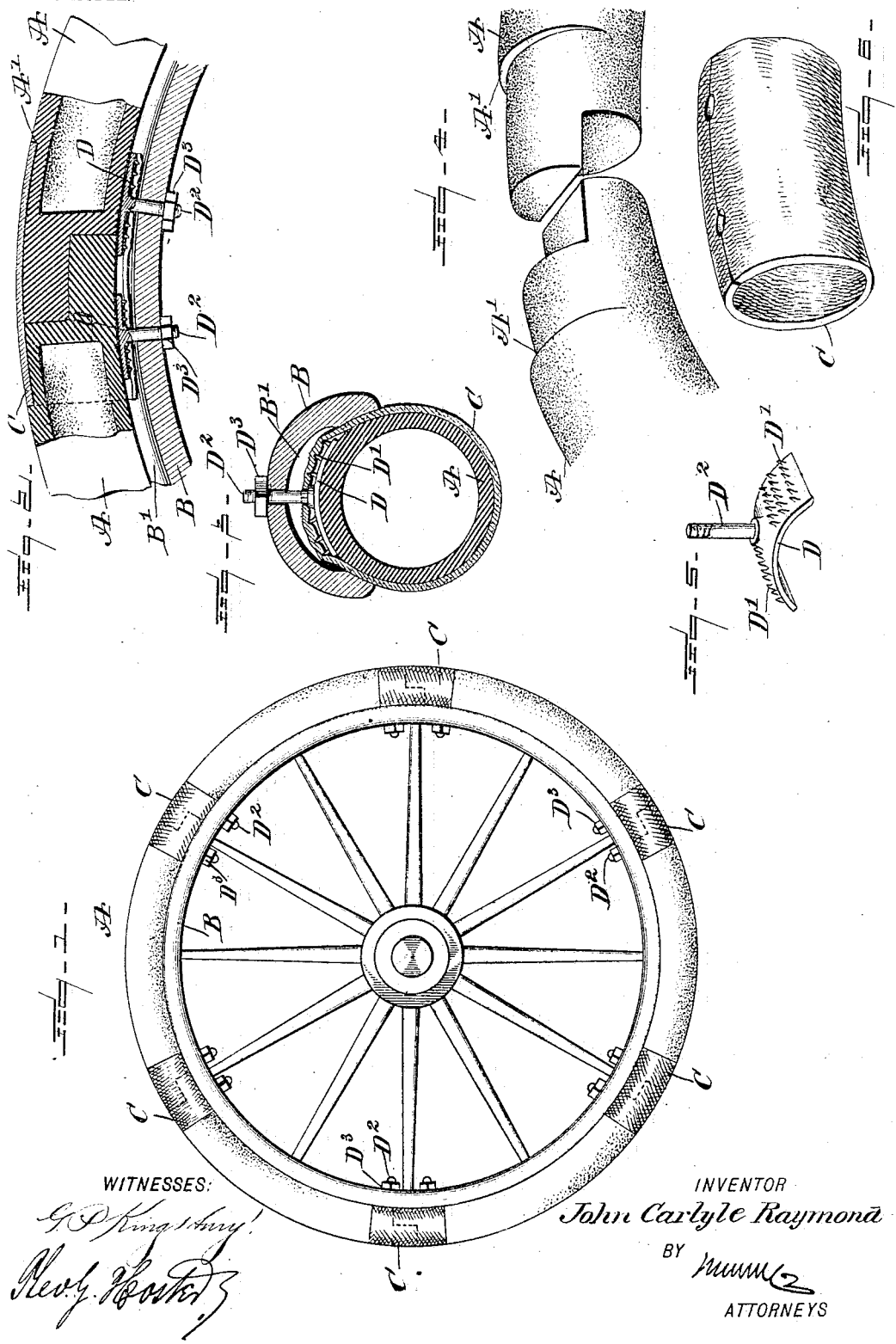

UNITED STATES PATENT OFFICE.

JOHN CARLYLE RAYMOND, OF NEW YORK, N. Y.

JOINT-BAND.

SPECIFICATION forming part of Letters Patent No. 769,405, dated September 6, 1904.

Application filed December 29, 1903. Serial No. 186,975. (No model.)

*To all whom it may concern:*

Be it known that I, JOHN CARLYLE RAYMOND, a citizen of the United States, and a resident of the city of New York, borough of Manhattan, in the county and State of New York, have invented a new and Improved Joint-Band, of which the following is a full, clear, and exact description.

The invention relates to tires such as shown and described in the Letters Patent of the United States No. 584,193, granted to me June 8, 1897.

The object of the invention is to provide a new and improved joint-band for covering the joints of adjacent tire-sections to prevent leakage and to securely hold the tire in place on the rim of the wheel.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied. Fig. 2 is an enlarged sectional side elevation of the improvement as applied. Fig. 3 is a cross-section of the same. Fig. 4 is a perspective view of the ends of adjacent tire-sections. Fig. 5 is a perspective view of one of the plates for fastening the band in place on the wheel-rim, and Fig. 6 is a perspective view of the split band.

The pneumatic tire A fits onto the usual rim B of a wheel, and the said tire is made in sections having a Z-shaped joint, as plainly indicated in Figs. 1, 2, and 4, and the ends of each section are preferably recessed, as at A', on the tread of the section, and in the recesses of adjacent sections fits a band C, made of rubber or other suitable material, the band being of a thickness corresponding to the depth of the recesses A', so as to render the outer face of the band flush with the tread of the tire, as will be readily understood by reference to Figs. 1 and 2. The split sides of the band extend into the usual annular recess B' in the rim B, as plainly shown in Figs. 2 and 3, and the said sides of the band are engaged by one, two, or more metallic plates D, curved to fit the curvature of the tire A, and the said metallic plate D is provided with pins or prongs D', engaging the material of the band C at the sides thereof. From each plate D extends the shank of a bolt $D^2$, passing through an aperture in the rim B to the outside, and on the outer threaded end of the shank of the bolt screws a nut $D^3$, abutting against the rim B, so that when the nut is screwed up the plate D is drawn inwardly, and in doing so carries the sides of the band C along and draws the latter tight around the joint of adjacent tire-sections to securely hold the tire in place on the wheel-rim, at the same time covering the joint, so as to prevent leakage of air from the interior of the pneumatic tire.

I do not limit myself to the particular means described for drawing the band C tight around the joint, as it is evident that equivalent devices may be employed for the purpose.

Having thus described my invention, I claim as new and desire to secure by Letters Patent—

1. A joint-band for sectional tires, comprising a band, split longitudinally, a metal plate having devices for engaging the sides of the band at the split, and means connected with the plate for drawing the band inward and tight around the joint of the tire-sections, as set forth.

2. A joint-band for sectional tires, comprising a flexible band split longitudinally and encircling the joint of adjacent tire-sections, a metal plate having pins engaging the sides of the band at the split, and a bolt on the plate, extending through an opening in the wheel-rim, the nut of the bolt abutting against the surface of the rim at the inside thereof.

3. The combination with a wheel having a sectional tire, the ends of the sections being recessed at the tread, of a band fitting the recesses of adjacent section ends, and means for drawing the band tight, as set forth.

4. The combination with a wheel having a sectional tire, the ends of the sections being recessed at the tread, of a band fitting the recesses of adjacent section ends, and means for drawing the band tight, the said means engaging the wheel-rim, as set forth.

In testimony whereof I have signed my name to this specification in the presence of two subscribing witnesses.

JOHN CARLYLE RAYMOND.

Witnesses:
 THEO. G. HOSTER,
 EVERARD BOLTON MARSHALL.